United States Patent
Fuhrmann, Jr. et al.

(10) Patent No.: US 9,195,384 B2
(45) Date of Patent: Nov. 24, 2015

(54) SYSTEM AND METHOD FOR PRESENTING INFORMATION IN AN INDUSTRIAL MONITORING SYSTEM

(71) Applicant: General Electric Company, Schenectady, NY (US)

(72) Inventors: Barrett Joseph Fuhrmann, Jr., Carson City, NV (US); Brian Martin Axness, Gardnerville, NV (US); Trevor Shaun Kavanaugh, Minden, NV (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 13/958,500

(22) Filed: Aug. 2, 2013

(65) Prior Publication Data
US 2015/0040051 A1 Feb. 5, 2015

(51) Int. Cl.
*G06F 3/048* (2013.01)
*G06F 3/0484* (2013.01)
*G05B 23/02* (2006.01)

(52) U.S. Cl.
CPC ........ *G06F 3/04847* (2013.01); *G05B 23/0272* (2013.01)

(58) Field of Classification Search
CPC .......................... G06F 3/0481; G05B 19/0426
USPC ................................ 715/771, 772; 700/17, 83
See application file for complete search history.

(56) References Cited

U.S. PATENT DOCUMENTS

| 2003/0028269 A1* | 2/2003 | Spriggs et al. ................... 700/83 |
| 2012/0023432 A1* | 1/2012 | Aguren .......................... 715/772 |
| 2012/0123747 A1 | 5/2012 | Kubli et al. |
| 2013/0021355 A1 | 1/2013 | Ramarao et al. |
| 2013/0290791 A1* | 10/2013 | Basile et al. ................. 714/47.1 |

OTHER PUBLICATIONS

U.S. Appl. No. 13/958,495, filed Aug. 2, 2013, Axness et al.
U.S. Appl. No. 13/958,506, filed Aug. 2, 2013, Fuhrmann, Jr. et al.
U.S. Appl. No. 13/958,511, filed Aug. 2, 2013, Axness et al.
European Search Report and Opinion issued in connection with corresponding EP Application No. 14178545.1 on Jan. 9, 2015.

(Continued)

*Primary Examiner* — Haoshian Shih
(74) *Attorney, Agent, or Firm* — Fletcher Yoder, P.C.

(57) ABSTRACT

A system includes an industrial monitor configured to receive inputs from a plurality of sensors coupled to a mechanical system. The industrial monitor is configured to determine a plurality of measurements corresponding to operation of the mechanical system based, at least in part, on the received inputs. The system includes a display device communicatively coupled to the industrial monitor, wherein the display device is configured to present a user interface having a plurality of screens, and wherein each of measurement is associated with at least one of the plurality of screens. Further, each screen of the plurality of screens is configured to selectively present a navigational indicator having an appearance when a measurement associated with a different screen has an irregular status.

19 Claims, 7 Drawing Sheets

(56) References Cited

OTHER PUBLICATIONS

3500 ENCORE System Overview, Bently Nevada* Asset Condition Monitoring, pp. 1-7, http://www.ge-mcs.com/download/monitoring/288080[1].pdf, accessed Jan. 29, 2013.

3500 ENCORE* Series, Machinery Protection System, Bently Nevada* Asset Condition Monitoring, GE Energy Measurement & Control Solutions, http://www.ge-mcs.com/download/monitoring/GEA18403-3500-Encore-Series_r15.pdf, accessed Jan. 29, 2013.

* cited by examiner

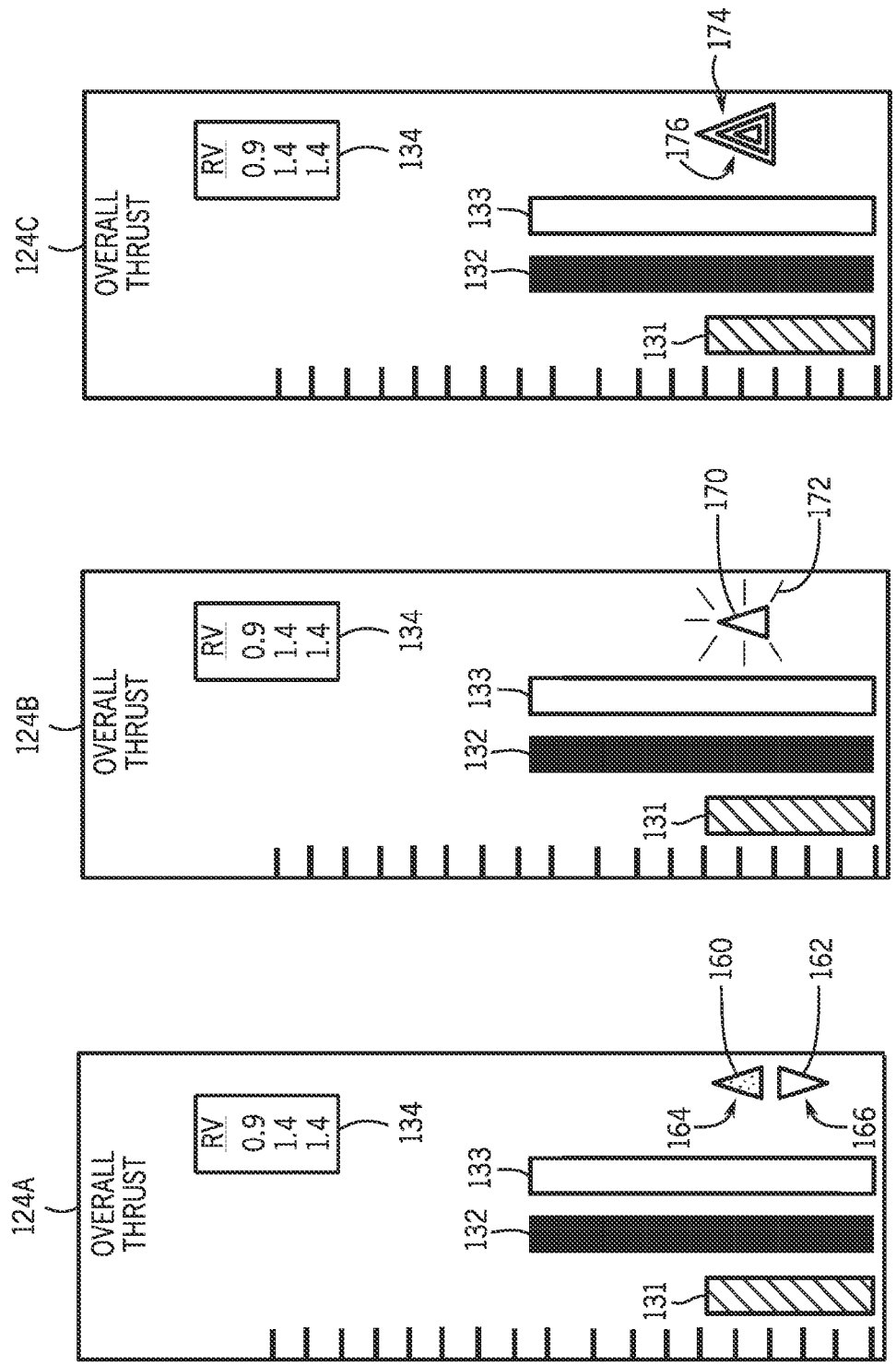

SYSTEM AND METHOD FOR PRESENTING INFORMATION IN AN INDUSTRIAL MONITORING SYSTEM

BACKGROUND OF THE INVENTION

The subject matter disclosed herein relates to industrial monitoring systems, such as asset condition monitoring systems.

Industrial monitoring systems, such as asset condition monitoring systems, generally provide monitoring capabilities for various types of mechanical devices and systems. For example, an industrial monitor may monitor one or more operational parameters of a gas turbine system. By specific example, the industrial monitoring system may include a number of sensors (e.g., temperature sensors, pressure sensors, flow sensors, and so forth) disposed throughout the gas turbine system. Such sensors may allow the industrial monitoring system to determine parameters of the mechanical system based, at least in part, on input received from these sensors. Additionally, certain industrial monitoring systems may include one or more graphical user interfaces (GUIs) that may be used to present (e.g., to an operator) the determined parameters of the mechanical system being monitored.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an industrial monitor configured to receive inputs from a plurality of sensors coupled to a mechanical system. The industrial monitor is configured to determine a plurality of measurements corresponding to operation of the mechanical system based, at least in part, on the received inputs. The system includes a display device communicatively coupled to the industrial monitor, wherein the display device is configured to present a user interface having a plurality of screens, and wherein each measurement is associated with at least one screen. Further, each screen of the plurality of screens is configured to selectively present a navigational indicator having an appearance when a measurement associated with a different screen has an irregular status.

In another embodiment, a method includes receiving inputs from a plurality of sensor devices coupled to a mechanical device and determining a plurality of measurements for the mechanical device based on the received inputs, wherein each of the plurality of measurements has a measurement type. The method also includes displaying a particular screen of a user interface on a display device, wherein the user interface includes a plurality of screens, and each screen is associated with a respective measurement type of the plurality of measurements. The method further includes selectively presenting a navigational indicator on the particular screen of the user interface based on respective statuses of one or more measurements that are not illustrated on the particular screen.

In another embodiment, a non-transitory, computer-readable medium stores instructions executable by a processor of an electronic device. The instructions include instructions to determine, via a processor, a plurality of measurements for a mechanical system based on sensor inputs received from one or more sensors coupled to the mechanical system. The instructions include instructions to present, on a display device, a first screen of a user interface, wherein the first screen includes a first portion of the plurality of measurements having a particular measurement type. The instructions also include instructions to selectively present, on the first screen, a first navigational indicator when the processor determines that a measurement of the plurality of measurements has a first irregular status and that the measurement is not a part of the first portion of the plurality of measurements.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a screen view of an embodiment of a direct view screen having directional indicators denoting that a measurement presented on a different direct view screen has an irregular status;

FIG. 8 is a screen view of an embodiment of a direct view screen having a directional indicator with animated emphasis;

FIG. 9 is a screen view of an embodiment of a direct view screen having a directional indicator with border emphasis;

DETAILED DESCRIPTION OF THE INVENTION

Figure 1:
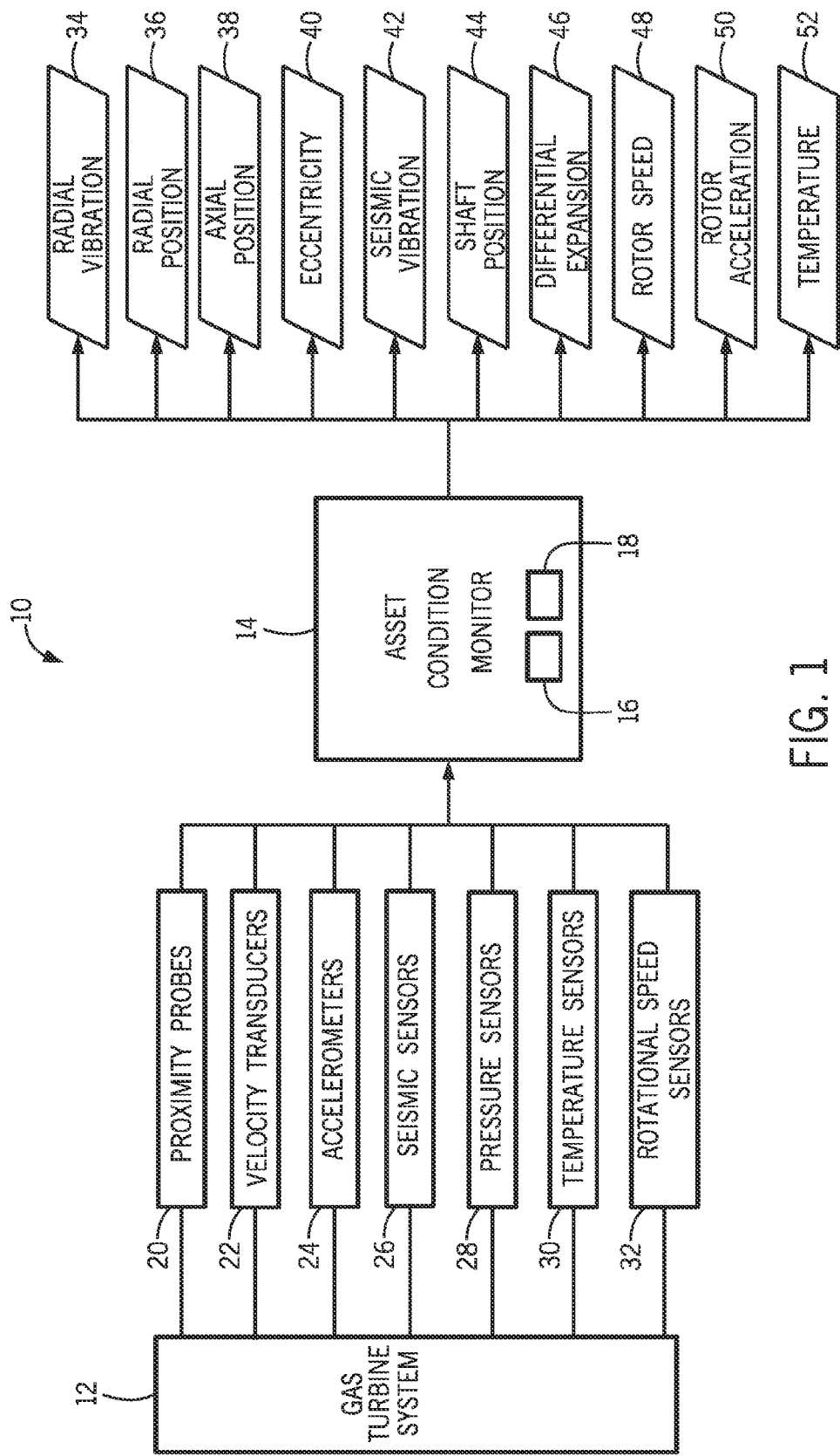
FIG. 1 is a diagram illustrating an embodiment of an industrial monitoring system, including certain inputs and outputs of the monitoring system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, industrial monitoring systems generally enable the monitoring of one or more operational parameters of a mechanical device or system, such as a turbomachine system, a power generation system, a gasification system, or a chemical production system. For example, the disclosed embodiments may be used or integrated with a gas turbine system, a stream turbine system, a combined cycle system, a power plant, or any combination thereof. An industrial monitoring system may include a number of sensors coupled to portions of a mechanical device to measure aspects of the mechanical device during operation. These sensors may include temperature sensors, pressure sensors, flow rate sensors, clearance sensors, proximity sensors, flame sensors, gas composition sensors, vibration sensors, current sensors, proximity sensors, voltage sensors, other suitable sensors, or combinations thereof. Accordingly, the industrial monitor may include a number of channels, each of which may receive input from one or more sensors to determine one or more measurements for the mechanical device or system. Furthermore, the industrial monitor may determine an appropriate status for each condition or measurement based, at least in part, on the value of each measurement relative to one or more predetermined threshold values.

As such, present embodiments are directed towards an industrial monitoring system that includes one or more display devices (e.g., disposed on the industrial monitor, a workstation, a portable monitoring device, a smart phone device, or another suitable device) to allow the industrial monitoring system to display a graphical user interface (GUI) to an operator. Further, the GUI may include various screens to display, for example, names for the channels of the industrial monitor as well as the measurements collected by each channel. The display devices of the industrial monitoring system may have limited dimensions, which, in turn, may limit the available screen space to display information.

Accordingly, present embodiments include features, discussed in detail below, that are generally directed toward maximizing an amount of information conveyed by each screen of the GUI displayed on the display devices. Present embodiments may use, for example, one or more visual effects or cues to convey to the operator a combined measurement status for each channel of the industrial monitor. This may allow the operator to determine, for example, that one or more channels include a measurement having an irregular status (e.g., a currently alarming or latched alarm status) without the operator having to navigate through several screens of the GUI to make a similar determination. Accordingly, present embodiments provide an efficient GUI that may enable an operator to more quickly identify and address an issue (e.g., one or more irregular measurement statuses) in the monitored mechanical device or system.

With the foregoing in mind, FIG. 1 illustrates an industrial monitoring system 10 for monitoring various operational parameters of a gas turbine system 12. It may be appreciated that, while a gas turbine system 12 is provided as one example of a monitored mechanical system, in other embodiments, the industrial monitoring system 10 may be used to monitor operational parameters of any mechanical devices or mechanical systems. For example, the industrial monitoring system 10 may be used to monitor operational parameters of axial compressors, screw compressors, gears, turbo-expanders, horizontal and vertical centrifugal pumps, electric motors, generators, fans, blowers, agitators, mixers, centrifuges, pulp refiners, ball mills, crushers, pulverizers, extruders, pelletizers, cooling towers, heat exchangers, or other suitable mechanical devices. Further, the industrial monitoring system 10 may be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The industrial monitoring system 10 illustrated in FIG. 1 includes an asset condition monitor 14, hereinafter referred to as monitor 14, including at least one processor 16 and memory 18. The monitor 14 illustrated in FIG. 1 is coupled to a number of sensors, including clearance sensors or proximity probes 20, velocity transducers 22, accelerometers 24, vibration or seismic sensors 26, pressure sensors 28, temperature sensors 30, and rotational speed sensors 32. It should be appreciated that the sensors 20, 22, 24, 26, 28, 30, and 32 are merely provided as examples, and that any other sensors (e.g., flow sensors, gas composition sensors, magnetic field sensors, flame sensors, current sensors, voltage sensors, and so forth) may be used that are suitable for performing measurements relevant to the operation and performance of a mechanical device or system (e.g., gas turbine system 12).

As illustrated in FIG. 1, the various sensors 20, 22, 24, 26, 28, 30, and 32 that are communicatively coupled to the monitor 14 may provide the monitor 14 with input such that the monitor 14 may, using the processor 16 and memory 18, determine one or more operational parameters of the monitored mechanical system (e.g., the gas turbine system 12). For example, the illustrated monitor 14 may receive input from measurements of the rotational speed of a shaft of the gas turbine system 12 from one or more rotational speed sensors 32, and may determine operational parameters (e.g., the rotation rate of the shaft, power output or load of the gas turbine system 12, or any other suitable operational parameter) based on the input received from the one or more rotational speed sensors 32, as well as other sensors functionally coupled to the gas turbine system 12. It may be appreciated that, as set forth in detail below, in certain embodiments, each operational parameter of the monitored mechanical system may be determined by a single channel of the monitor 14, and each channel of the monitor 14 may determine one or more measurements (e.g., based on the inputs received from the sensors 20, 22, 24, 26, 28, 30, and 32) in order to determine the operational parameter.

FIG. 1 illustrates some example operational parameters of the monitored mechanical system (e.g., gas turbine system 12) that may be determined (e.g., calculated or estimated) by the monitor 14 based on the various inputs received from sensors 20, 22, 24, 26, 28, 30, and 32. For the embodiment illustrated in FIG. 1, the monitor 14 may determine radial vibration 34, radial position 36, axial position 38, eccentricity 40, seismic vibration 42, shaft position 44, differential expansion 46, rotor speed 48, rotor acceleration 50, temperature 52, and/or any other suitable operational parameter of the gas turbine system 12, or any component thereof (e.g., compressors, shafts, pumps, valves, etc.). For example, the monitor 14 may use the processor 16 and memory 18 to process input from one or more proximity probes 20 to determine a differential expansion 46 of a casing of turbine section of the gas turbine system 12. By further example, the monitor 14 may process input from one or more rotational speed sensors 32 and/or one or more accelerometers 24 to determine rotor acceleration 50 of a shaft of the gas turbine system 12.

In certain embodiments, a number of monitors (e.g., monitor 14) may be combined in a modular fashion to form a modular monitoring system. For example, the modular asset condition monitoring system 60 illustrated in FIG. 2, hereinafter referred to as monitoring system 60, includes a number of modules suitable for performing particular functions during operation of the monitoring system 60. For example, in the embodiment of the monitoring system 60 illustrated in FIG. 2, a power supply module 61 may receive alternating current (AC) or direct current (DC) power and perform any suitable power conversions to provide power to the monitoring system 60. In other embodiments, the power supply module 61 may not be a module of the modular asset condition monitoring system 60, but may rather be a separate component coupled to the modular asset condition monitoring system 60. The illustrated monitoring system 60 also includes a system monitor or transient data interface (TDI) 62, which may provide the monitor's primary interface to the configuration, display, condition and monitoring software, and to external control systems. For example, the TDI 62 may support suitable communication protocols to communicatively couple the monitoring system 60 to other monitoring systems 64, to control systems 66 (e.g., process control systems, historians, and other plant control and automation systems), to computer workstations 68, to portable monitoring devices 70, to portable computing devices 72, and/or other suitable devices.

Figure 2:
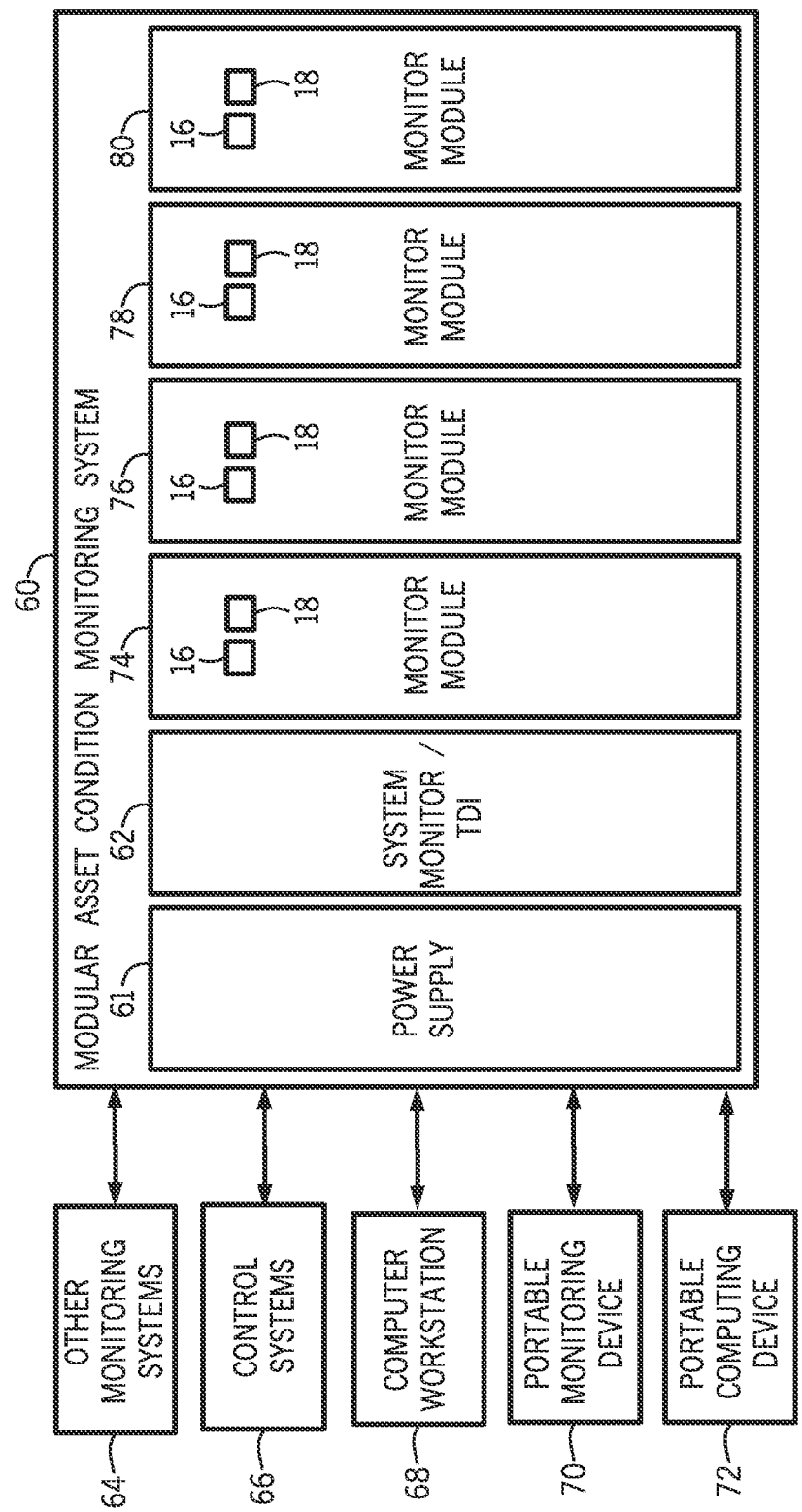
FIG. 2 is a diagram illustrating an embodiment of a modular asset condition monitor as well as other devices in communication with the monitor.

In addition to the power supply module 61 and the TDI 62, the monitoring system 60 illustrated in FIG. 2 also include a number of other modules, namely monitor modules 74, 76, 78, and 80, each an embodiment of the asset condition monitor 14 of FIG. 1. That is, each monitor module 74, 76, 78, and 80 may include a respective processor 16 and memory 18 configured to receive and process inputs from a variety of sensors (e.g., sensors 20, 22, 24, 26, 28, 30, and/or 32 of FIG. 1) to determine one or more operational parameters of the monitored mechanical device or system (e.g., gas turbine system 12). For example, monitor module 74 may include a number of channels (e.g., 4, 5, 6, 8, 10, 12, 16, 18, 20, or another suitable number of channels), each of which may receive input from a number of sensors to determine one of: radial vibration 34, radial position 36, axial position 38, eccentricity 40, differential expansion 46, rotor speed 48, rotor acceleration 50, or another suitable operational parameter of a mechanical system. By specific example, the monitor module 76 may include four channels, each of which may receive input from a number of sensors or determine one of case expansion or other types of differential expansion (e.g., standard single ramp differential expansion, non-standard single ramp differential expansion, dual ramp differential expansion, complementary differential expansion), axial position 38, and other positional measurements (e.g., valve position). By further example, the monitor module 78 may, in certain embodiments, include six channels, each dedicated to monitoring a particular temperature 52 in a portion of the monitored mechanical system.

Accordingly, each channel of a monitor module may receive a number (e.g., 1 to 500, 1 to 100, 1 to 50, or 1 to 20) of inputs from a number of sensors (e.g., sensors 20, 22, 24, 26, 28, 30, and/or 32) to determine an operational parameter of the mechanical system. It may further be appreciated that each channel may include a number (e.g., 1, 2, 4, 5, 6, 7, 8, or another suitable number) of underlying measurements that may be determined, based on received sensor input, in route to determining the overall operational parameter value for the mechanical system. For example, an embodiment of a four-channel monitor module (e.g., monitor module 74) may determine four operational parameters of the mechanical system; however, since, in certain embodiments, each channel may include 8 measurements, such a four-channel monitor may actually determine up to 32 individual measurements from the sensor input. By specific example, in certain embodiments, a radial vibration channel may determine up to 8 measurements, including a basic overall (direct) vibration amplitude, gap voltage, filtered amplitude (e.g., 1× filtered amplitude and 2× filtered amplitude), filtered phase (e.g., 1× filtered phase and 2× filtered phase), NOT 1× amplitude, and Smax (e.g., maximum phase). Further, it may be appreciated that alarm thresholds may be individually set for each measurement determined by each channel (e.g., Smax should remain below a threshold value to avoid an alarm condition). Other embodiments of monitor modules may include 1 to 100 (e.g., 1, 2, 3, 4, 5, 6, 7, 8, 9, 10, 11, 12, 13, 14, or 15) channels, each capable of determining 1 to 100 (e.g., 1, 2, 3, 4, 5, 6, 7, 8, 9, 10) measurements, to monitor an operational parameter of a mechanical system. Additionally, other embodiments of the modular monitoring system 60 may include, for example, 1 to 50, 1 to 25, 1 to 10, 1 to 8 monitor modules.

Figure 3:
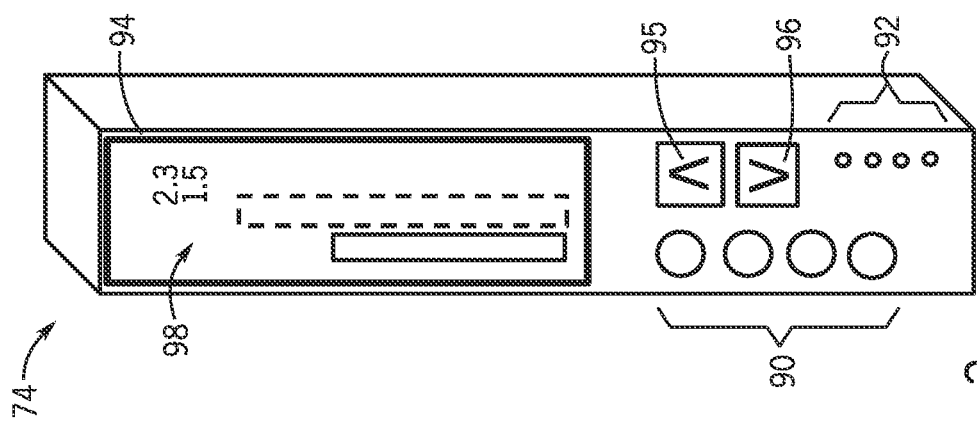
FIG. 3 is a perspective view of an embodiment of a module of the modular asset condition monitor of FIG. 2, including a screen for displaying a graphical user interface (GUI)

FIG. 3 illustrates a perspective view of an embodiment of the monitor module 74 of FIG. 2. The illustrated embodiment of the monitor module 74 includes four buffered output connections 90 (e.g., coaxial connections or other suitable connections) disposed on a front face of the monitor module 74 that may be coupled to portable test instrumentation by an operator. In other embodiments, the monitor module 74 may include any number of buffered output connections 90. Additionally, in certain embodiments, the monitor module 74 may also include a number of light emitting diodes (LEDs) 92 disposed on the front face of the monitor module 74 that may be used to indicate a status (e.g., normal, alert, connected, bypass, node voltage, "Not Ok", or a similar status) of the monitor module 74.

The illustrated monitor module 74 of FIG. 3 also includes a display device 94 that may be used to display information to an operator of the monitor module 74. For example, the display device may be a liquid crystal display (LCD), light-emitting diode (LED), organic light-emitting diode (OLED), or another suitable color display device. Further, the monitor module 74 also includes input devices (e.g., up arrow button 95 and down arrow button 96) that may be manipulated by an operator, for example, to control which of a number of screens of a graphical user interface (GUI) 98 is currently being displayed on the display device 94. In other embodiments, other input devices (e.g., buttons, dials, keyboards, mice, touch screens, or any other suitable input device) may additionally or alternatively be used with the module 74. As discussed in detail below, the GUI 98 may include screens for the names of the channels currently being monitored by the monitor module 74 as well as graphical representations for the measurements currently being collected by each of the channels.

Figure 5:
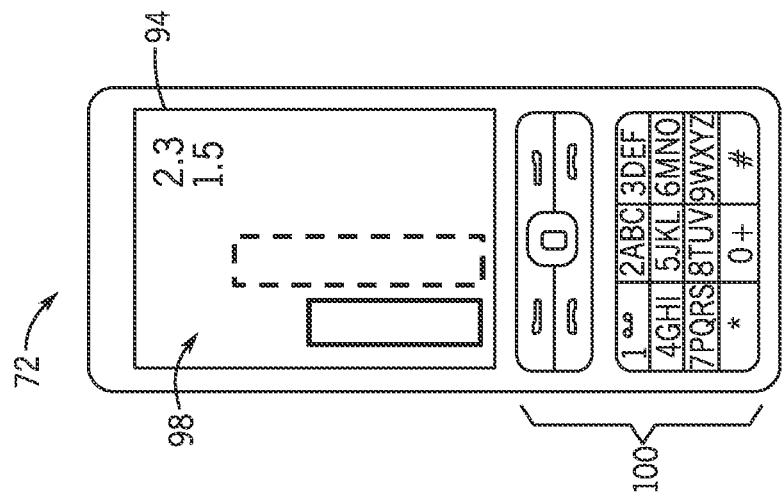
FIG. 5 is a perspective view of an embodiment of a portable computing device, including a screen for displaying a GUI.
Figure 4:
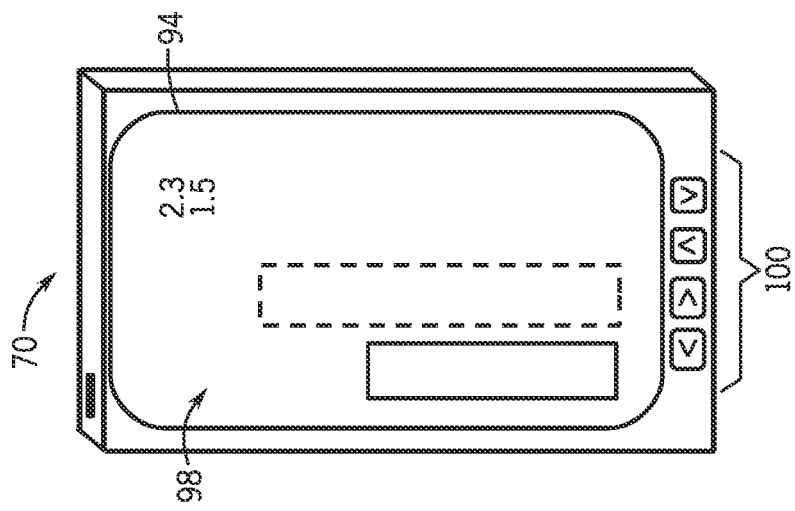
FIG. 4 is a perspective view of an embodiment of a portable monitoring device, including a screen for displaying a GUI.

It may be appreciated that, as illustrated in FIG. 2, in certain embodiments, other devices may be used to present the GUI 98. Accordingly, FIG. 4 illustrates a perspective view of an embodiment of the portable monitoring device 70, which may be a small, tablet-like device that may be used to present the GUI 98 to an operator. Similarly, FIG. 5 illustrates a perspective view of an embodiment of the portable computing device 72, which may be a smart phone, tablet, laptop, or similar mobile processing device. Both the portable monitoring device 70 of FIG. 4 and the portable computing device 72 of FIG. 5 may generally include a processor that may be used to execute instructions stored in a memory to present, on the respective display devices 94, the various screens of the GUI 98. Also, the portable monitoring device 70 and the portable computing device 72 may include communication circuitry (e.g., wireless networking circuitry) to allow the devices to communicate with the monitoring system 60 in order to present the GUI 98. Additionally, the portable monitoring device 70 and the portable computing device 72 may include user inputs 100 that may be used by an operator to, for example, control which screen of the GUI 98 is currently presented on the display device 94 of each device, respectively.

Figure 6:
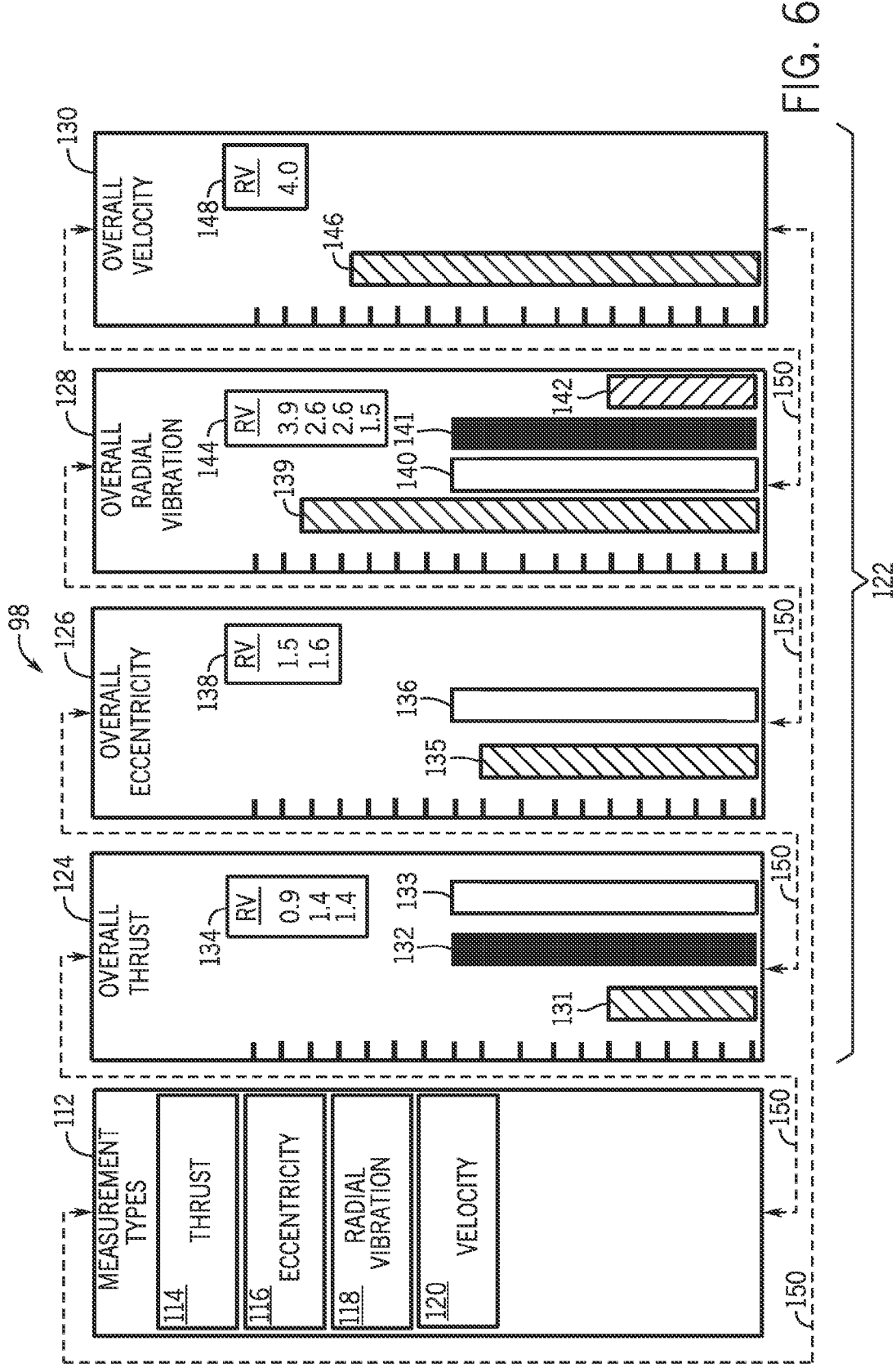
FIG. 6 is a diagram illustrating a number of screens for an embodiment of the GUI.

FIG. 6 illustrates an embodiment of the GUI 98 that may be displayed on one or more of the respective displays 94 of the monitor module 74 of FIG. 3, the portable monitoring device 70 of FIG. 4, and/or the portable computing device 72 of FIG. 5. As illustrated in FIG. 6, in certain embodiments, the GUI 98 may include a number of screens that are logically arranged in a continuous loop such that an operator may progressively cycle through all screens of the GUI 98 by continually pressing a user input (e.g., the up arrow button 95 or the down arrow button 96 illustrated in FIG. 3). As illustrated in FIG. 6, the first screen may be a measurement type screen 112, which may include a list (e.g., a visual representation) of the types of measurements currently being performed by the monitor (e.g., monitor module 74). For the illustrated embodiment, the measurement type screen 112 includes four measurement types, namely measurement type 114 (i.e., THRUST), measurement type 116 (i.e., ECCENTRICITY), measurement type 118 (i.e., RADIAL VIBRATION), and measurement type 120 (i.e., VELOCITY).

The GUI 98 illustrated in FIG. 6 includes a number of direct view screens 122, namely direct view screens 124, 126, 128, and 130, each of which may be respectively associated with a particular measurement type (e.g., one of measurement types 114, 116, 118, 120). For example, direct view screen 124 of FIG. 6 illustrates three graphical representations (e.g., bar graphs 131, 132, and 133), each representing a different overall thrust measurement currently being determined by different channels of the monitor module 74. By specific example, each of the overall measurements 131, 132 and 133 may provide a total or cumulative thrust measurement being determined by the monitor module 74 for three different components of the monitored mechanical system 12. Additionally, the illustrated direct view screen 124 includes a real-time value (RV) section 134 that may be used to present numerical values for the overall measurements 131, 132, and 133 illustrated on the direct view screen 124. It may be appreciated that, in other embodiments, the graphical representations may be line graphs, pie charts, Venn diagrams, or any other suitable graphical representations that may be presented on the display devices 94 discussed above. It may also be appreciated that the presentation of the data (e.g., the data scales, units, tick marks, etc.) on the discussed direct view screens are for illustrative purposes and are not intended to limit the present disclosure by conveying particular or relative values for the illustrated measurements.

It may be appreciated that the illustrated overall measurements illustrated in the GUI 98 of FIG. 6 (e.g., overall measurements 131, 132, and 133) may each represent an operational parameter of a particular measurement type (e.g., THRUST) being determined by one or more channels of the monitor module 74. In other words, the overall measurements 131, 132, and 133 may each represent a culmination of a number of underlying measurements that may be, as discussed above, determined by each channel based on inputs from one or more sensors. It may further be appreciated that, in certain embodiments, the GUI 98 may include additional screens for each of the measurements determined by each channel. For example, in certain embodiments, if each channel of the monitor module 74 includes 8 measurements (e.g., overall amplitude, gap voltage, 1× filtered amplitude, 2× filtered amplitude, 1× filtered phase, 2× filtered phase, NOT 1× amplitude, and Smax), 7 additional direct view screens may be inserted after each overall direct view screen (e.g., direct view screens 124, 126, 128, and 130) in the GUI 98 illustrated in FIG. 6. Further, it may be appreciated that, for such embodiments, each of the additional screens may illustrate multiple measurements of the same measurement type. For the illustrated embodiment, since the overall thrust direct view screen 124 illustrates three different overall measurements of the THRUST measurement type 114 via the bar graphs 131, 132, and 133, each additional screen (e.g., a gap voltage screen, a 1× filtered amplitude screen, a 2× filtered amplitude screen, a 1× filtered phase screen, a 2× filtered phase screen, a NOT 1× amplitude screen, and a Smax screen) associated with the THRUST measurement type 114 may similarly include three bar graphs, each corresponding to a measurement of a different component of the monitored mechanical system 12.

As illustrated in FIG. 6, direct view screen 126 includes a bar graphs 135 and 136, which graphically illustrate overall measurements of the ECCENTRICITY measurement type 116. Further, like the direct view screen 124, the illustrated direct view screen 126 includes a RV section 138 that may be used to present numerical values for the overall measurements illustrated by the bar graphs 135 and 136. The illustrated direct view screen 128 includes bar graphs 139, 140, 141, and 142 representing overall measurements of the RADIAL VIBRATION measurement type 118. The direct view screen 128 further includes a RV section 144 to present numerical values for the overall measurements illustrated by bar graphs 139, 140, 141, and 142. Further, the illustrated direct view screen 130 includes a bar graph 146 representing a single overall measurement of the VELOCITY measurement type 120, as well as a RV section 148 to present the numerical value for the overall measurement illustrated by the bar graph 146. As such, it may be appreciated that any of the direct view screens 122 may include any number of (e.g., 1, 2, 3, 4, 5, 6, 7, 8, 9, or more) graphical representations (e.g., bar graphs) to illustrate multiple measurements of the same measurement type.

Additionally, as mentioned above, an operator may navigate through the various screens of the GUI 98 using, for example, the user inputs 95 and/or 96, illustrated in FIG. 3. As such, as illustrated for the embodiment of FIG. 6, the GUI 98 includes a number of directional arrows 150 that connect each of the screens 112, 124, 126, 128, and 130, to one another to indicate which screen may be subsequently presented based on the input provided by the operator. For example, as illustrated for the embodiment of FIG. 6, when viewing screen 112, if the GUI 98 receives operator input from the down arrow button 96, the GUI 98 may discontinue presentation of the screen 112, and may proceed with presenting the screen 124. Then, when the GUI 98 is presenting the screen 124, if the GUI 98 receives operator input from the down arrow button 96 once again, then the GUI 98 may cause the display 94 to present the screen 126. However, if, when the GUI 98 is presenting the screen 124, the GUI 98 instead receives operator input from the up arrow button 95, then the GUI 98 may cause the display 94 to present the screen 112 once again. As such, as indicated by the directional arrows 150, the GUI 98 may be logically arranged as a continuous loop that allows the operator to cycle through the various screens of the GUI 98 using, for example, a single user input (e.g., up arrow button 95 or down arrow button 96). It may be appreciated that the layouts illustrated by FIG. 6 are merely provided as examples, and that in certain embodiments, other arrangements of screens and/or other arrangements of the elements on the screens may be utilized within the GUI 98.

With the foregoing in mind, it may be appreciated that, when an operator is viewing a particular screen of the GUI 98, the amount of information that may be presented may be limited, for example, by the size of the display device 94. For example, when the operator is viewing the direct view screen 124 illustrated in FIG. 6, the operator may not be capable of concurrently viewing the information on contained on screen 128 of the GUI 98. As such, as illustrated in FIG. 6, an operator viewing the direct view screen 124 may be unaware that the measurement type 118, associated with the direct view screen 128, has one or more measurements experiencing an irregular status. As used herein, an irregular status may refer, for example, a currently alarming status (e.g., a measurement having a value currently beyond a predetermined threshold value), a latched alarm status (e.g., a measurement having a value that has previously exceeded the predetermined threshold value for which the alarm has not been cleared), a bypass status (e.g., a measurement that is temporarily not being determined), or any other status that is not a normal or healthy status. As such, present embodiments enable methods of encoding additional information in the presentation of the screens of the GUI 98 (e.g., the direct view screens 122), such that an operator may be able to glean additional information regarding the statuses of the various measurements being determined by each channel in an efficient manner.

For example, FIGS. 7-12 illustrate embodiments of the direct view screen 124 illustrated in FIG. 6. More specifically, FIGS. 7-12 illustrate direct view screens 124A-F having one or more navigational indicators (e.g., directional indicators) that may enable an operator viewing any of the direct view screens 124A-F to ascertain that another measurement (e.g., different than the measurement being presented on the direct view screen 124A-F, respectively) has an irregular status (e.g., a currently alarming status, a latched alarm status, a bypass status, or any other irregular status). Further, as set forth in detail below, in certain embodiments, the navigational indicators also may convey to the operator a severity of the irregular status (e.g., a number of measurements having an irregular status, an amount of time that the measurements have had an irregular status, how far beyond the threshold values the measurements have reached, or similar indication of severity) being experienced by one or more measurements. It should be appreciated that, in certain embodiments, any one or more of the presentations of navigational indicators described for the embodiments of FIGS. 7-12 may be used together in various combinations.

For example, FIG. 7 is a screen view of an embodiment of a direct view screen 124A that, as set forth above, includes the three bar graphs 131, 132, and 133 as well as the RV section 134. Additionally, as illustrated for the direct view screen 124A, two directional indicators (e.g., up directional indicator 160 and down directional indicator 162), which may generally be used to indicate that another measurement (e.g. other than the overall thrust of bearing 2) has an irregular status. For example, the up directional indicator 160 and/or the down directional indicator 162 may be illustrated in a particular manner (e.g., having a particular fill color and/or border color) to illustrate to the operator that another measurement has an irregular status.

In other words, as illustrated in FIG. 6 and discussed above, in certain embodiments, the GUI 98 may be logically arranged as a continuous loop of screens disposed one after another such that the operator may progressively navigate the GUI 98 using, for example, user inputs 95 and 96. Accordingly, in certain embodiments, the direct view screen 124A illustrated in FIG. 7 may include the up directional indicator 160 (e.g., corresponding to the up arrow button 95) and/or the down directional indicator 162 (e.g., corresponding to the down arrow button 96) to indicate which direction the operator should proceed through the GUI 98 to reach the direct view screen 122 associated with the measurement having the irregular status (e.g., shortest path to the screen that will present the measurement with the irregular status). In certain embodiments, the direct view screen 124A may only include a single navigational indicator (e.g., directional indicator 160) to indicate that the operator may provide a corresponding input (e.g., the up arrow button 95 of FIG. 3) one or more times to reach the direct view screen that presents the measurement having an irregular status. In certain embodiments, both directional indicators (e.g., directional indicators 160 and 162) may be used to indicate that multiple measurements have irregular statuses, and that the operator may provide corresponding inputs (e.g., the up arrow button 95 or the down arrow 96 of FIG. 3) to view the direct view screens associated with the measurements experiencing the irregular statuses.

Further, in certain embodiments, the directional indicators (e.g., directional indicators 160 and 162) may provide an indication of the severity of the irregular statuses being experienced by other measurements. For example, as illustrated in FIG. 7, the up directional indicator 160 has a fill color 164 that may indicate that the measurement experiencing the irregular status in the indicated direction has a more severe status than the measurement experiencing the irregular status in the down direction (e.g., as illustrated by down directional indicator 162 having a fill color 166). By specific example, in certain embodiments, the color of the up directional indicator 160 may be red to indicate to the operator that a measurement depicted on a direct view screen disposed somewhere above the presently presented direct view screen 124A may be experiencing a currently alarming status. Further, in such an embodiment, the color of the down directional indicator 162 may be yellow to indicate that a measurement disposed somewhere below the direct view screen 124 may be experiencing a latched alarm status. It may be appreciated that the colors set forth above are provided merely as examples, and that any suitable color (e.g., orange, green, blue, purple, grey, black, etc.) may be used to convey to the operator a severity of the irregular status being experienced by another measurement. In certain embodiments, a shade of the color (e.g., dark yellow to bright yellow) may be used to indicate a progressively increasing state of severity of the measurement. Additionally, in certain embodiments, the severity may be based on, for example, a number of measurements in the indicated direction having an irregular status, an amount of time that the one or more measurements in the indicated direction have had the irregular statuses, how far beyond the respective threshold values each of the one or more measurements have reached, and/or similar indications of severity.

FIG. 8 illustrates a screen view of another embodiment of a direct view screen 124B having a directional indicator 170 with animated emphasis. That is, for the illustrated embodiment, the direct view screen 124B includes a single directional indicator 170 that denotes that at least one measurement associated with a particular direct view screen (e.g., disposed some number of screens above the direct view screen 124B currently being presented by the GUI 98) is experiencing an irregular status. Further, the illustrated directional indicator 170 includes animated emphasis, as indicated by the lines 172. For example, in certain embodiments, the directional indicator 170 may blink, flash, strobe, or any include any other suitable animated emphasis that may convey to the operator the direction and/or the severity of the direct view screen illustrating the measurement having the irregular status.

By specific example, the directional indicator 170 may, in certain embodiments, utilize a rate or frequency of the animated emphasis (e.g., a blinking or strobing rate) to indicate a severity of the statuses of one or more measurements illustrated on direct view screens disposed in the indicated direction. For example, in certain embodiments, the directional indicator 170 may blink at a first (e.g., slower) rate to indicate that one measurement having an irregular status is disposed on a direct view screen in the indicated direction, and may blink at a second (e.g., faster) rate to indicate that more than one measurement having irregular statuses are disposed on direct view screens in the indicated direction. It may be appreciated that the above is merely an example, and that the disclosed animated emphasis 172 may be used to convey any suitable measure of severity (e.g., an amount of time that the one or more measurement in the indicated direction have had the irregular statuses, how far beyond the respective threshold values each of the one or more measurements have reached, and/or similar indications of severity).

FIG. 9 illustrates a screen view of another embodiment of a direct view screen 124C having a directional indicator 174 with border emphasis 176. That is, for the illustrated embodiment, the direct view screen 124C includes a single directional indicator 174 that denotes that at least one measurement associated with a particular direct view screen (e.g., disposed some number of screens above the direct view screen 124C currently being presented by the GUI 98) is experiencing an irregular status. For the illustrated directional indicator 174, a number of borders 176 have been added to the directional indicator 174 to illustrate a severity of the irregular status.

For example, in certain embodiments, the directional indicator 174 may not include any border 176 if only one measurement associated with a direct view screen disposed above the direct view screen 124C has an irregular status. For such an embodiment, additional borders 176 may be added to the directional indicator 174 to indicate that multiple measurements have irregular statuses, and that these measurements are associated with respective direct view screens disposed in the indicated direction. It may be appreciated that the above is merely an example, and that the disclosed border emphasis 176 may be used to convey any suitable measure of severity (e.g., an amount of time that the one or more measurement in the indicated direction have had the irregular statuses, how far beyond the respective threshold values each of the one or more measurements have reached, and/or similar indications of severity). Further, in certain embodiments, the border emphasis 176 may additionally or alternatively include borders with progressively increasing thickness, changing colors, and so forth, to indicate progressively increasing severity of the irregular statuses of the one or more measurements.

Figure 10:
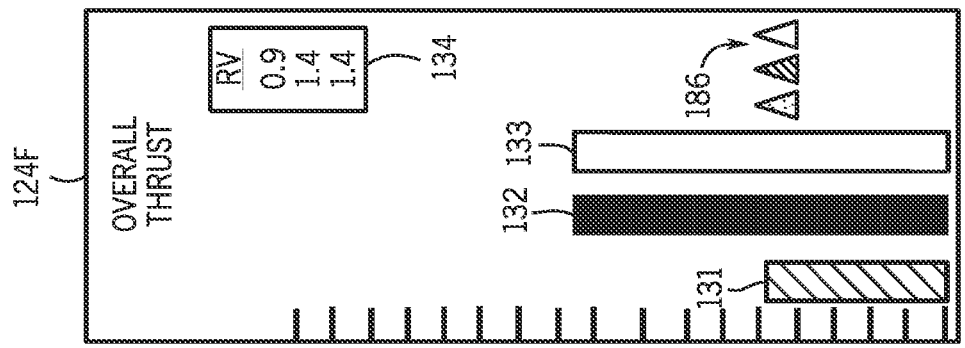
FIG. 10 is a screen view of an embodiment of a direct view screen having a directional indicator with character emphasis.

FIG. 10 is a screen view of another embodiment of a direct view screen 124D having a directional indicator 180 with character emphasis 182. That is, the direct view screen 124D includes one or more characters 182 that may be used to convey to the operator, a measure of the severity of an irregular status being experienced by at least one measurement associated with a direct view screen disposed in the indicated direction. For example, in certain embodiments, the one or more characters 182 may include characters that may convey a relative severity, such as using an exclamation mark to represent high severity, an asterisk to represent medium severity, and a minus sign may represent low severity. In certain embodiments, the one or more characters 182 may include a value from an enumerated range (e.g., a numerical value on a scale from 1 to 100 or an alphabetic character in the range A to Z) to indicate a severity of the irregular statuses being experienced by the one or more measurements. In other embodiments, the one or more characters 182 may be a numerical value that may indicate a number of measurements experiencing the irregular status in the direction depicted by the directional indicator 180. In still other embodiments, the one or more characters 182 may be a numerical value indicating a number in corresponding user inputs (e.g., a number of operator button presses using up arrow button 95) that the operator may provide to reach the measurement experiencing the irregular status.

Figure 11:
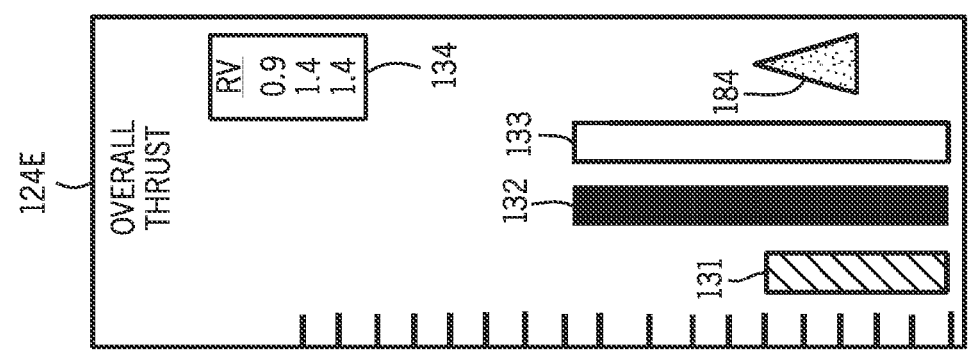
FIG. 11 is a screen view of an embodiment of a direct view screen having an enlarged directional indicator.

FIG. 11 illustrates a screen view of another embodiment of a direct view screen 124E having an enlarged directional indicator 184. That is, in certain embodiments, the directional indicator 184 may use size to indicate the severity of the one or more measurements experiencing the irregular status. For example, the directional indicator 184 may initially be presented as a smaller directional indicator, but may be enlarged as the severity increases. By specific example, the directional indicator 184 may initially be presented as a small directional indicator (e.g., like the directional indicator 160 of FIG. 7), but may then be enlarged, as illustrated in FIG. 11, as the number of measurements experiencing an irregular status continues to increase. It may be appreciated that the above is merely an example, and that the size of the disclosed directional indicator 184 may be used to convey any suitable measure of severity (e.g., an amount of time that the one or more measurement in the indicated direction have had the irregular statuses, how far beyond the respective threshold values each of the one or more measurements have reached, and/or similar indications of severity).

Figure 12:
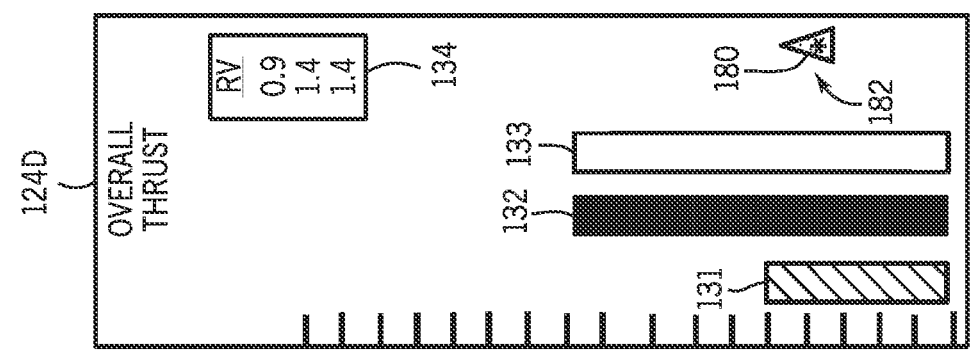
FIG. 12 is a screen view of an embodiment of a direct view screen having an multiple directional indicators, each with a color to indicate the severity of the irregular status.

FIG. 12 is a screen view of another embodiment of a direct view screen 124F having a multiple directional indicators 186 that denote a number of measurements experiencing an irregular status in the indicated direction. For example, as illustrated in FIG. 12, the direct view screen 124F includes three directional indicators 186, indicating that three measurements associated with direct view screens in the indicated direction are experiencing irregular statuses. Further, it may be appreciated that each of the directional indicators 186 may further be illustrated in a particular manner (e.g., having a particular color, animated emphasis, border emphasis, character emphasis, size, or other suitable manners discussed above) to convey additional information about the severity of each measurement experiencing the irregular statuses. For example, as illustrated in FIG. 12, each of the directional indicators 186 may have a different background color to indicate a relative severity of each of the irregular statuses.

Figure 13:
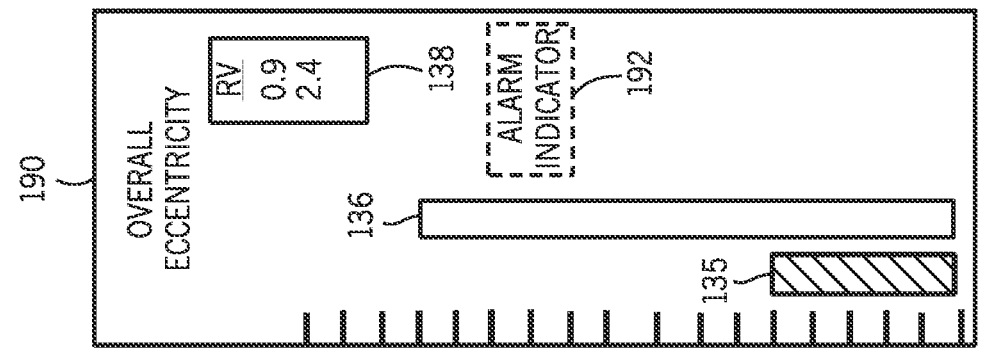
FIG. 13 is a screen view of an embodiment of a direct view screen for a measurement type experiencing an irregular status.

FIG. 13 is a screen view of an embodiment of a direct view screen for a channel experiencing an irregular status. That is, in one example, the GUI 98 may first present the direct view screen 124A illustrated in FIG. 7, which includes the directional indicator 162 that denotes that the operator should provide corresponding user inputs (e.g., using down arrow button 96 of FIG. 3) to view the direct view screen associated with the measurement having the irregular status. Accordingly, once the operator has provided the appropriate inputs, the GUI 98 may present the direct view screen 190 illustrated in FIG. 13, which corresponds to the measurement with the irregular status. For the illustrated example, the direct view screen 190 illustrates THRUST measurements (e.g., measurements of the THRUST measurement type 114) using the bar graphs 135 and 136 (in which the measurement associated with bar graph 136 is triggering the irregular status), and further includes an alarm indicator 192. However, it may be appreciated that, for this example, since no other measurements currently have an irregular status, no directional indicator may be presented on the direct view screen 190 illustrated in FIG. 13.

Figure 14:
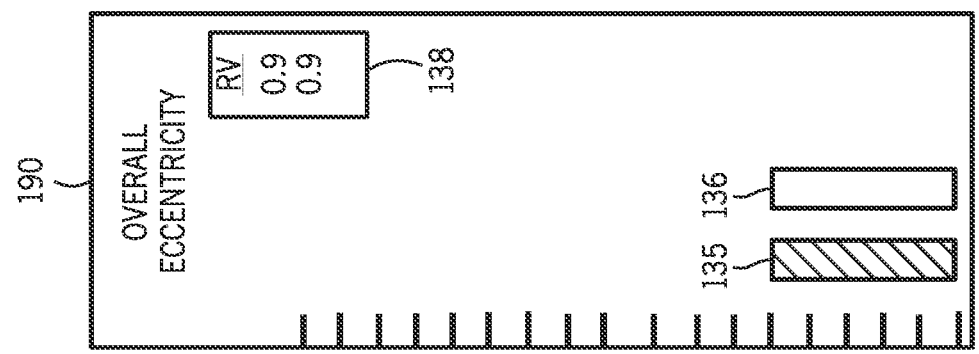
FIG. 14 is a screen view of the direct view screen embodiment of FIG. 13, after the offending measurement returns to a normal or healthy status.

FIG. 14 is a screen view of the direct view screen embodiment of FIG. 13 after the offending measurement (e.g., represented by bar graph 136) has returned to a normal or healthy status and the alarm has been cleared. That is, the direct view screen 190 illustrated in FIG. 14 no longer presents the alarm indicator 192 illustrated in FIG. 13. For example, the direct view screen 190 illustrated in FIG. 14 may be presented once a latched alarm status has been cleared by the operator, and accordingly, the alarm indicator 192 may not be presented on the direct view screen 190. Further, it may be appreciated that, for this example, since no other measurements currently have an irregular status, again no directional indicators may be presented on the direct view screen 190 illustrated in FIG. 14.

Figure 15:
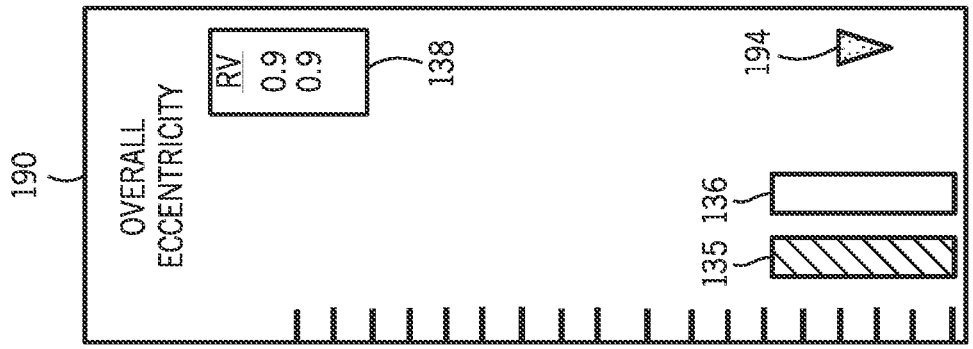
FIG. 15 is a screen view of the direct view screen embodiment of FIG. 14 having a directional indicator denoting that a measurement presented on a different direct view screen has an irregular status.

However, if another measurement subsequently reaches an irregular status, then one or more directional indicators may be presented once again. For example, FIG. 15 illustrates a screen view of the direct view screen 190 having a directional indicator denoting that another measurement having an irregular status is presented on a direct view screen 122 in the indicated direction. That is, for the example described above, the direct view screen 190 illustrated in FIG. 14 may not include directional indicators since no other measurements may be experiencing an irregular status. However, as illustrated in FIG. 15, if one or more measurements (e.g., measurements associated with direct view screens disposed some number of screens below the direct view screen 190 currently being presented) experience an irregular status, then an appropriate directional indicator 194 may be presented on the direct view screen 190. Further, it may be appreciated that the directional indicator 194 may include any one or more of the visual effects set forth above (e.g., having a particular color, animated emphasis, border emphasis, character emphasis, size, or other suitable visual effects), alone or in combination, to convey a severity of the one or more measurements experiencing an irregular status.

Technical effects of the invention include enabling an operator to glean more information from screens of a GUI displayed on a display device of an industrial monitoring system. For example, the present approach enables an operator to visually ascertain that one or more measurements (corresponding to direct view screens different from a direct view screen being viewed) are experiencing irregular statuses as well as which inputs may be provided to view the one or more measurements. The present approach further provides for the use of visual effects (e.g., fill or border colors, animation emphasis, border emphasis, character emphasis, size emphasis, and so forth) to convey to the operator both the relative direction of the direct view screens of interest and the severity of the irregular statuses, all without interfering with the normal presentation of measurement data. Accordingly, the present approach enables the operator to immediately be made aware of measurements experiencing irregular statuses and, therefore, enables the operator to more quickly address any potential problems with the monitored mechanical system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an industrial monitor configured to receive measurements from a plurality of sensors coupled to a mechanical system, wherein the industrial monitor is configured to determine a plurality of parameters corresponding to operation of the mechanical system based, at least in part, on the received measurements; and
   a monitoring device communicatively coupled to the industrial monitor, wherein the monitoring device is configured to individually present a series of screens on a display in response to user input, wherein each of the plurality of parameters is respectively associated with a particular screen of the series of screens, and wherein each particular screen of the series of screens is configured to selectively present a navigational indicator when a parameter that is associated with a different screen of the series of screens has an irregular status, and wherein the navigational indicator has an appearance that indicates the user input that will cause the different screen to be presented on the display of the monitoring device.

2. The system of claim 1, wherein the appearance of the navigational indicator is configured to progressively change to convey a changing severity of the irregular status of the parameter that is associated with the different screen.

3. The system of claim 1, wherein the appearance of the navigational indicator is configured to progressively change when other parameters of the plurality of parameters that are associated with other screens of the series of screens have irregular statuses.

4. The system of claim 1, wherein each particular screen of the series of screens is configured to selectively present a second navigational indicator when a second parameter associated with a second different screen of the series of screens has a second irregular status, wherein the second navigational indicator has an appearance that indicates the user input will cause the second different screen to be presented on the display of the monitoring device.

5. The system of claim 4, wherein the appearance of the second navigational indicator is configured to progressively change to convey a changing severity of the second irregular status of the second parameter that is associated with the second different screen.

6. The system of claim 1, wherein the appearance of the navigational indicator comprises a fill or border color, an animation emphasis, a border emphasis, a character emphasis, a size emphasis, or a combination thereof.

7. The system of claim 1, wherein the irregular status comprises a currently alarming status, a latched alarm status, a bypass status, or a combination thereof.

8. The system of claim 1, wherein the display device is disposed on the industrial monitor, a portable monitoring device, a mobile computing device, or a combination thereof.

9. The system of claim 1, wherein the mechanical system comprises a gas turbine system, a steam turbine system, a hydraulic turbine system, wind turbines, or an industrial automation system.

10. A method, comprising:
receiving measurements from a plurality of sensor devices coupled to a mechanical device;
determining a plurality of parameters of the mechanical device based on the received measurements;
displaying a particular screen of a series of screens on a display device, wherein each screen of the series of screens is configured to present a respective parameter of the plurality of parameters; and
selectively presenting a navigational indicator on the particular screen when a parameter of the plurality of parameters has an irregular status and when the parameter is not presented on the particular screen, wherein an appearance of the navigational indicator indicates a user input that will cause a different screen of the series of screens to be displayed on the display device, wherein the different screen is configured to present the parameter having the irregular status.

11. The method of claim 10, wherein the user input comprises a button press, a pointer selection, a touch-screen selection, or a combination thereof.

12. The method of claim 11, comprising receiving the user input and, in response, displaying the different screen on the display device.

13. The method of claim 12, comprising individually displaying the series of screens on the display device in response to receiving the user input.

14. The method of claim 10, wherein the irregular status comprises a currently alarming status, a latched alarm status, a bypass status, or a combination thereof.

15. The method of claim 10, wherein the appearance of the navigational indicator comprises a fill or border color, an animation emphasis, a border emphasis, a character emphasis, a size emphasis, or a combination thereof, and wherein the appearance further indicates a severity of the irregular status.

16. A non-transitory, computer-readable medium storing instructions executable by a processor of an electronic device, the instructions comprising:
instructions to determine, via a processor, a plurality of parameters of a mechanical system based on measurements received from one or more sensors coupled to the mechanical system;
instructions to display, on a display device, a first screen of a series of screens, wherein the first screen presents only a first parameter of the plurality of parameters; and
instructions to selectively present, on the first screen, a first navigational indicator when the processor determines that a second parameter of the plurality of parameters has an irregular status, wherein the first navigational indicator has an appearance that indicates a first user input that will cause a second screen of the series of screens to be displayed on the display device, wherein the second screen is configured to present only the second parameter of the plurality of parameters.

17. The medium of claim 16, comprising instructions to receive the first user input; and comprising instructions to present, on the display device, the second screen in response to receiving the first user input.

18. The medium of claim 17, comprising instructions to present, on the second screen, a second navigational indicator when the processor determines that a third parameter of the plurality of parameters has an irregular status, wherein the second navigational indicator has an appearance that indicates a second user input that will cause a third screen of the series of screens to be displayed on the display device, wherein the third screen presents only the third parameter of the plurality of parameters.

19. The medium of claim 18, comprising instructions to receive the second user input; and comprising instructions to present, on the display device, the third screen in response to the second user input.

* * * * *